(12) United States Patent
Watabe et al.

(10) Patent No.: US 12,523,636 B2
(45) Date of Patent: Jan. 13, 2026

(54) TWO-DIMENSIONAL LIQUID CHROMATOGRAPH SYSTEM

(71) Applicant: SHIMADZU CORPORATION, Kyoto (JP)

(72) Inventors: Yoshiyuki Watabe, Kyoto (JP); Yoshihiro Hayakawa, Kyoto (JP); Tetsuo Iida, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 673 days.

(21) Appl. No.: 16/958,283

(22) PCT Filed: Dec. 27, 2017

(86) PCT No.: PCT/JP2017/046847
§ 371 (c)(1),
(2) Date: Jun. 26, 2020

(87) PCT Pub. No.: WO2019/130460
PCT Pub. Date: Jul. 4, 2019

(65) Prior Publication Data
US 2021/0055270 A1 Feb. 25, 2021

(51) Int. Cl.
| | |
|---|---|
| *G01N 30/34* | (2006.01) |
| *G01N 30/16* | (2006.01) |
| *G01N 30/46* | (2006.01) |
| *G01N 30/84* | (2006.01) |

(52) U.S. Cl.
CPC ............. *G01N 30/34* (2013.01); *G01N 30/16* (2013.01); *G01N 30/46* (2013.01); *G01N 30/84* (2013.01)

(58) Field of Classification Search
CPC ........ G01N 30/34; G01N 30/16; G01N 30/46; G01N 30/84
USPC ....................................................... 73/61.55
See application file for complete search history.

(56) References Cited

U.S. PATENT DOCUMENTS

| | | | |
|---|---|---|---|
| 2013/0008859 | A1 | 1/2013 | Witt |
| 2014/0183137 | A1 | 7/2014 | Witt |

FOREIGN PATENT DOCUMENTS

| | | | |
|---|---|---|---|
| CN | 102866216 A | | 1/2013 |

OTHER PUBLICATIONS

International Search Report for PCT/JP2017/046847, dated Mar. 20, 2018.

(Continued)

*Primary Examiner* — Peter J Macchiarolo
*Assistant Examiner* — Rodney T Frank
(74) *Attorney, Agent, or Firm* — Sughrue Mion, PLLC

(57) ABSTRACT

A two-dimensional liquid chromatograph system includes a first dimension analysis part, a second dimension analysis part, a second dimension feeding device, a fraction introduction part, a shift gradient program creation part, a liquid feeding control part, and a shift timing adjustment part. The shift gradient program creation part is configured to create a shift gradient program for causing the second dimension feeding device to execute shift gradient liquid feeding. The shift timing adjustment part is configured to adjust a shift timing to each stage in the shift gradient program created by the shift gradient program creation part based on a preliminary chromatogram acquired by the first dimension detector before the series of analysis operations for the sample to be analyzed.

4 Claims, 6 Drawing Sheets

(56) References Cited

OTHER PUBLICATIONS

Written Opinion for PCT/JP2017/046847, dated Mar. 20, 2018.
Extended European Search Report dated Jun. 8, 2021 in European Application No. 17936571.3.
Office Action dated Jun. 28, 2022 issued by the Chinese Patent Office in Chinese Application No. 201780097238.2.

Shift gradient program before adjustment

Shift gradient program after adjustment

Shift gradient program after adjustment

TWO-DIMENSIONAL LIQUID CHROMATOGRAPH SYSTEM

CROSS REFERENCE TO RELATED APPLICATIONS

This application is a National Stage of International Application No. PCT/JP2017/046847 filed Dec. 27, 2017.

TECHNICAL FIELD

The present invention relates to a two-dimensional liquid chromatograph system including a first dimension analysis part that performs separation analysis of a sample, and a second dimension analysis part that further analyzes a sample component eluted from an analysis column of the first dimension analysis part.

BACKGROUND ART

In order to perform analysis using a liquid chromatograph in more detail, there is a case where a two-dimensional liquid chromatograph system is used. The two-dimensional liquid chromatograph system is configured to perform first dimension analysis of a sample using a first dimension analysis column (hereinafter, a first dimension analysis column), and then second dimension analysis by guiding an eluate from the first dimension analysis column to a second dimension analysis column (hereinafter, a second dimension analysis column).

In the two-dimensional liquid chromatograph system, in order to continuously guide an eluate from the first dimension analysis column to the second dimension analysis column, two sample loops that capture part of the eluate from the first dimension analysis column as a modulation are used. The sample loops are continuously alternately switched by a switching valve and connected downstream of the first dimension analysis column, and while one of the sample loops is connected downstream of the first dimension analysis column, the other sample loop is connected to the second dimension analysis column. From an upstream side of the sample loop connected to the second dimension analysis column, a mobile phase for performing separation analysis of the second dimension is delivered. In this manner, the eluate from the first dimension analysis column is divided into a plurality of modulations, and each modulation is sequentially and continuously introduced into the second dimension analysis column.

In such a two-dimensional liquid chromatograph system, in order to perform the second dimension analysis more efficiently, there is a case where gradient liquid feeding for temporally changing a composition of a mobile phase for separation analysis of the second dimension (hereinafter, a mobile phase for the second dimension analysis) is performed a plurality of times, and a gradient profile of the gradient liquid feeding is changed in a stepwise manner. Changing a gradient profile of the gradient liquid feeding repeated as described above in a stepwise manner is called shift gradient liquid feeding. In a case where shift gradient liquid feeding is performed, a gradient program is created so that the gradient liquid feeding shifts to a next stage with a different gradient profile at regular intervals. The gradient profile is an initial concentration or a final concentration of a mobile phase in the gradient liquid feeding.

SUMMARY OF THE INVENTION

Problems to be Solved by the Invention

As described above, in the two-dimensional liquid chromatograph system, the sample loops that capture an eluate from the first dimension analysis column are switched at regular intervals, divided into a plurality of modulations, and introduced into the second dimension analysis column. For this reason, the same sample component separated in the first dimension analysis column and eluted from the first dimension analysis column may be divided into two or more modulations.

In a case where the same sample component is divided into two or more modulations, modulations containing the same sample component are sometimes introduced into the second dimension analysis column at a timing at which a stage of the shift gradient liquid feeding of the mobile phase for the second dimension analysis is shifted.

When a stage of the shift gradient liquid feeding is shifted, the initial concentration and the like of the gradient change. For this reason, when modulations containing the same sample component are introduced into the second dimension analysis column at a timing at which a stage of the shift gradient liquid feeding is shifted, analysis of the second dimension is performed with gradient profiles different from each other even for the modulations containing the same sample component, and a difference occurs in the retention time in the second dimension analysis column for a sample component contained in each modulation, which adversely affects a result of the second dimension analysis.

In view of the above, an object of the present invention is to cause, even in a case where a plurality of modulations containing the same sample component exist, separation analysis of the second dimension to be performed under the same gradient liquid feeding condition for a sample component contained the modulations.

Solutions to the Problems

A two-dimensional liquid chromatograph system according to the present invention includes a first dimension analysis part, a second dimension analysis part, a second dimension feeding device, a fraction introduction part, a shift gradient program creation part, a liquid feeding control part, and a shift timing adjustment part.

The first dimension analysis part includes a first dimension analysis channel through which a mobile phase for first dimension analysis flows, a sample injection part configured to inject a sample into the first dimension analysis channel, a first dimension analysis column provided on the first dimension analysis channel to separate a sample injected by the sample injection part into each component, and a dimension detector provided downstream of the first analysis column on the first analysis channel to acquire a chromatogram based on an eluate from the first dimension analysis column.

The second dimension analysis part includes a second dimension analysis channel, a second dimension analysis column provided on the second dimension analysis channel, and a second dimension detector for detecting components separated by the second dimension analysis column.

The second dimension feeding device feeds a mobile phase for the second dimension analysis in the second dimension analysis channel.

The fraction introduction part is configured to divide an eluate from the first dimension analysis column into a plurality of modulations and to continuously introduce the modulations into the second dimension analysis channel.

A shift gradient program creation part is configured to create a shift gradient program. The shift gradient program is for causing the second dimension feeding device, during a series of analysis operations for a sample to be analyzed, to repeat, a plurality of times, gradient liquid feeding in which a composition of the mobile phase for second dimension analysis is temporally changed, and to execute shift gradient liquid feeding in which a gradient profile of the gradient liquid feeding is changed in a stepwise manner.

A liquid feeding control part is configured to control operation of the second dimension feeding device so that the second feeding device executes the shift gradient liquid feeding based on a shift gradient program created by the shift gradient program creation part.

A shift timing adjustment part is configured to adjust a timing to shift (hereinafter, a shift timing) at which a stage of gradient liquid feeding in a shift gradient program, which is created by the shift gradient program creation part, is shifted to new one having a different gradient profile based on a preliminary chromatogram acquired by the first dimension detector before the series of analysis operations for the sample to be analyzed.

A preferred embodiment of the present invention further includes a display device that displays information, and the shift timing adjustment part is configured to display the preliminary chromatogram on the display device, and to set a timing designated by the user on the preliminary chromatogram as the shift timing. This allows the user to designate a timing of shifting to each stage by referring to the preliminary chromatogram. Accordingly, the adjustment of the shift timing is facilitated.

In a further preferred embodiment of the present invention, the shift timing adjustment part is configured to display dividing timings, at which the eluent is divided into the plurality of the modulations by the fraction introduction part, on the display device in a manner superimposing the dividing timings on the preliminary chromatogram. This allows the user to visually recognize how an eluate from the first dimension analysis column is divided into the plurality of modulations together with the chromatogram. Accordingly, the adjustment of the shift timing is further facilitated.

One embodiment of the fraction introduction part includes a plurality of sample loops, and is configured to continuously perform, by switching the sample loops to be connected to each of the first dimension analysis column and the second dimension analysis channel, connecting any one of the sample loops downstream of the first dimension analysis column so that part of an eluate from the first dimension analysis column is captured in the sample loop as one modulation, and, at the same time, connecting one of the sample loops not connected downstream of the first dimension analysis column to the second dimension analysis channel so that the modulation captured in the sample loop is introduced into the second dimension analysis channel.

Effects of the Invention

A two-dimensional liquid chromatograph system according to the present invention is configured so that a shift timing of shift gradient liquid feeding can be adjusted based on a preliminary chromatogram for a sample to be analyzed. Accordingly, even in a case where a plurality of modulations containing the same sample component exist, a shift gradient program can be modified so that gradient liquid feeding with the same gradient profile for these modulations is performed. This makes it possible to reliably perform separation analysis of the second dimension under the same gradient liquid feeding condition for the same sample component divided into a plurality of modulations.

EMBODIMENT OF THE INVENTION

Hereinafter, an embodiment of a two-dimensional liquid chromatograph will be described using the drawings.

Figure 1:
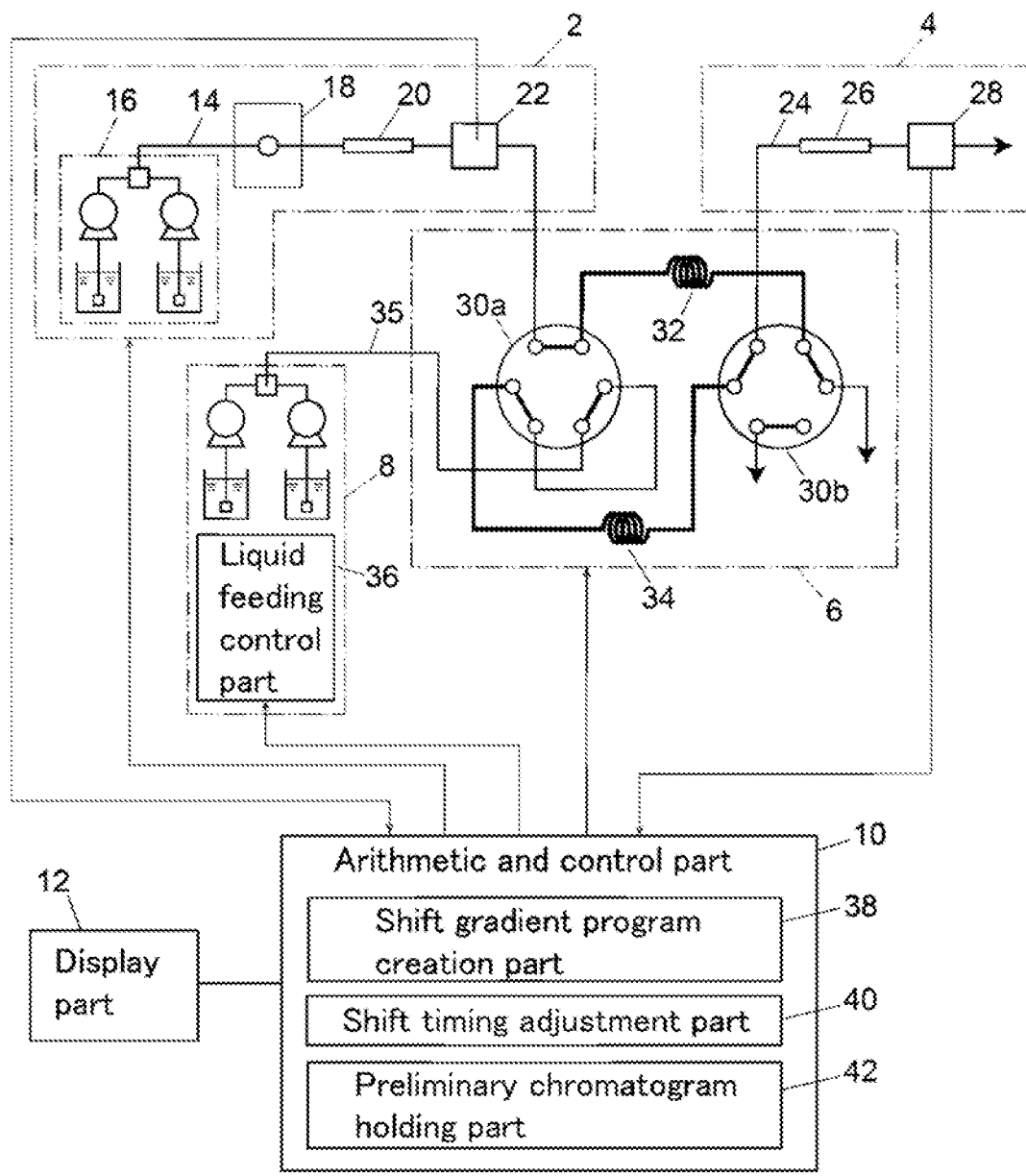
FIG. 1 is a schematic configuration diagram showing one embodiment of a two-dimensional liquid zone chromatograph system.

FIG. 1 shows a schematic configuration of the two-dimensional liquid chromatograph system.

The two-dimensional liquid chromatograph system of the present embodiment includes a first dimension analysis part 2, a second dimension analysis part 4, a fraction introduction part 6, a second dimension feeding device 8, an arithmetic and control part 10, and a display part 12.

The first dimension analysis part 2 is for performing first dimension analysis, and includes a first dimension analysis channel 14, a first dimension feeding device 16, a sample injection part 18, a first dimension analysis column 20, and a first dimension detector 22. The first dimension feeding device 16 is for feeding a mobile phase in the first dimension analysis channel 14. The sample injection part 18 is configured to automatically collect a sample contained in a sample container and inject the sample into the first dimension analysis channel 14. The first dimension analysis column 20 is provided downstream of the sample injection part 18 on the first dimension analysis channel 14, and separates the sample injected by the sample injection part 18 into components. The first dimension detector 22 is for detecting the components separated in the first dimension analysis column 20, and is provided downstream of the first dimension analysis column 20 on the first dimension analysis channel 14. A detection signal obtained by the first dimension detector 22 is taken into the arithmetic and control part 10.

A downstream end of the first dimension analysis channel 14 of the first dimension analysis part 2 is connected to one port of a switching valve 30a of the fraction introduction part 6. The fraction introduction part 6 is configured to divide an eluate from the first dimension analysis column through the first dimension detector 22 of the first dimension analysis part 2 into a plurality of modulations, and sequentially introduce each of the modulations into the second dimension analysis part 4.

The fraction introduction part 6 includes the switching valves 30a and 30b having six connection ports and two sample loops 32 and 34. One end of each of the sample loops 32 and 34 is connected to a port adjacent to a port, to which the first dimension analysis channel 14 of the first dimension analysis part 2 is connected, among the connection ports of the switching valve 30a, and a downstream end of the first dimension analysis channel 14 is connected to either one of the sample loops 32 and 34. The other end of each of the sample loops 32 and 34 is connected to a port adjacent to a port, to which a second dimension analysis channel 24 of the second dimension analysis part 4 is connected, among the connection ports of the switching valve 30b, and an upstream end of the second dimension analysis channel 24 is connected to either one of the sample loops 32 and 34. The other connection port of the switching valve 30a is also connected to a second dimension mobile phase liquid feeding channel 35 through which a second dimension analysis mobile phase fed by the second dimension feeding device 8 flows.

The switching valves 30a and 30b are switched in synchronization with each other, and can be connected to either one of a state (state of FIG. 1) in which the second dimension mobile phase liquid feeding channel 35 and the second dimension analysis channel 24 are connected via the sample loop 34 while the sample loop 32 is connected downstream of the first dimension analysis channel 14 and a state in which the second dimension mobile phase liquid feeding channel 35 and the second dimension analysis channel 24 are connected via the sample loop 32 while the sample loop 34 is connected downstream of the first dimension analysis channel 14.

When one of the sample loops 32 and 34 is connected downstream of the first dimension analysis channel 14, part of an eluate from the first dimension analysis column 20 is captured by the one of the sample loop 32 and 34 as a modulation. At this time, the other one of the sample loops 34 and 32 is connected between the second dimension mobile phase liquid feeding channel 35 and the second dimension analysis channel 24, and the modulation captured by the sample loop 34 or 32 is introduced into the second dimension analysis part 4 by a mobile phase for the second dimension analysis fed by the second dimension feeding device 8. The switching valves 30 are alternately switched to one state at regular intervals. In this manner, an eluate from the first dimension analysis column 20 is introduced into the second dimension analysis part 4 while being divided into a plurality of modulations.

Note that, in the present embodiment, a function of the fraction introduction part 6 is realized by two of the switching valves 30a and 30b and two of the sample loops 32 and 34. However, the present invention is not limited to the above. One switching valve (for example, a ten-port valve) may be used instead of the switching valves 30a and 30b.

On the second dimension analysis channel 24 of the second dimension analysis part 4, a second dimension analysis column 26 and a second dimension detector 28 for performing analysis of the second dimension are provided. A detection signal obtained by the second dimension detector 28 is taken into the arithmetic and control part 10.

Figure 2:
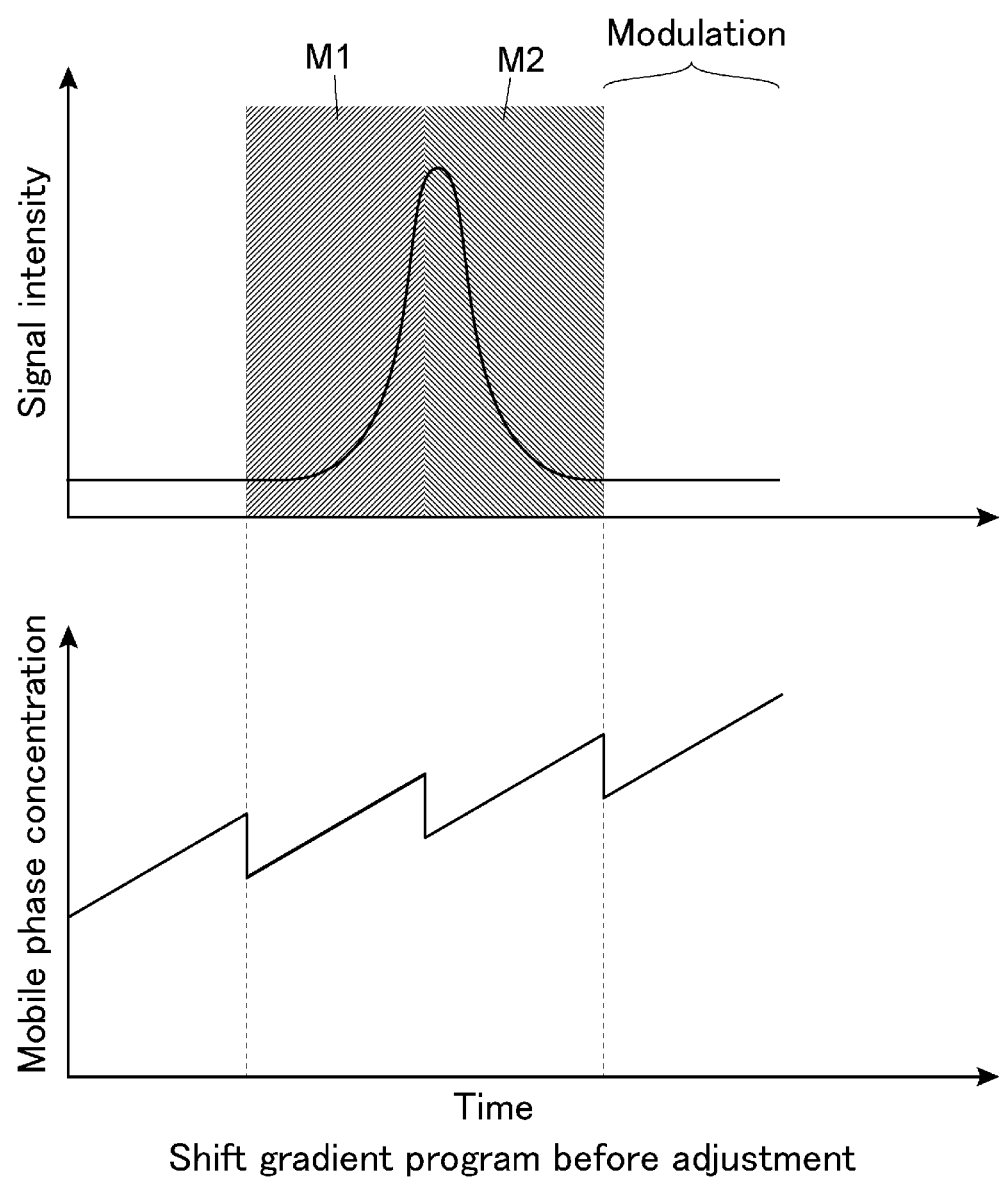
FIG. 2 is a diagram showing an example of a chromatogram obtained by a first dimension analysis part of the embodiment and an example of a gradient program before adjustment.

The second dimension feeding device 8 includes a liquid feeding pump that feeds at least two kinds of solvents, and is configured to mix and feed these solvents as the mobile phase for the second dimension analysis. The second dimension feeding device 8 is provided with a liquid feeding control part 36 that controls the operation of the liquid feeding pump. The liquid feeding control part 36 is configured to execute shift gradient liquid feeding of the mobile phase for the second dimension analysis based on a shift gradient program provided from the arithmetic and control part 10. The shift gradient liquid feeding is a liquid feeding method of repeating gradient liquid feeding that, as shown in a graph on the lower side of FIG. 2, temporally changes the concentration of a predetermined solvent (shown as the mobile phase concentration in the diagram) in the mobile phase for the second dimension analysis, and changing a gradient profile of the gradient liquid feeding in a stepwise manner. In the example of FIG. 2, the gradient liquid feeding is programmed to be repeated in synchronization with a division timing to modulations by the fraction introduction part 6.

Figure 5:
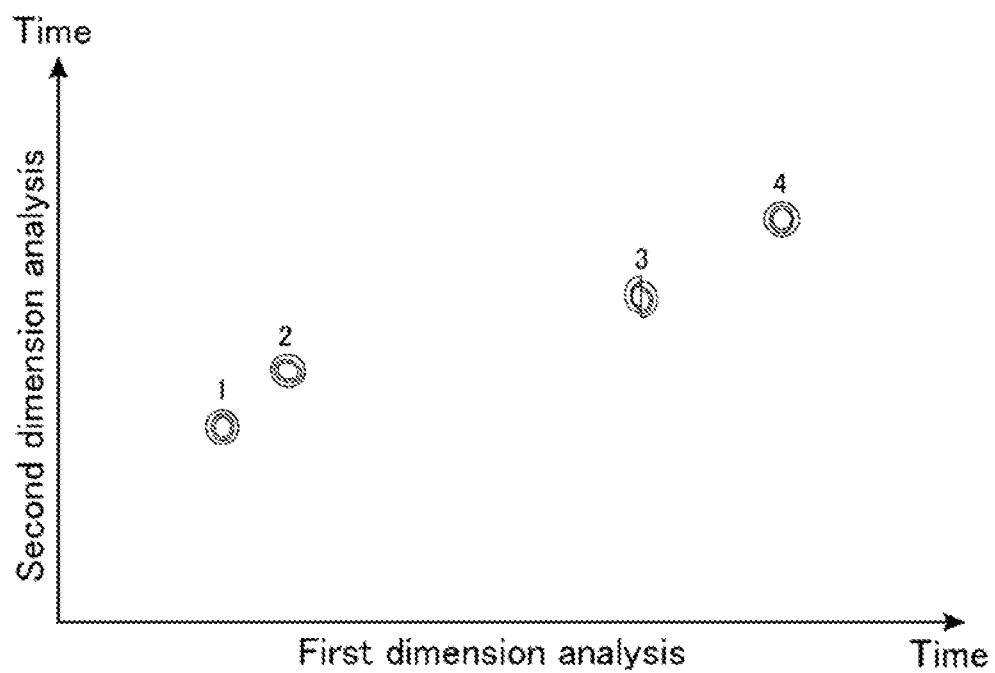
FIG. 5 is an example of analysis data of a two-dimensional liquid chromatograph obtained without adjustment of a shift gradient program.
Figure 6:
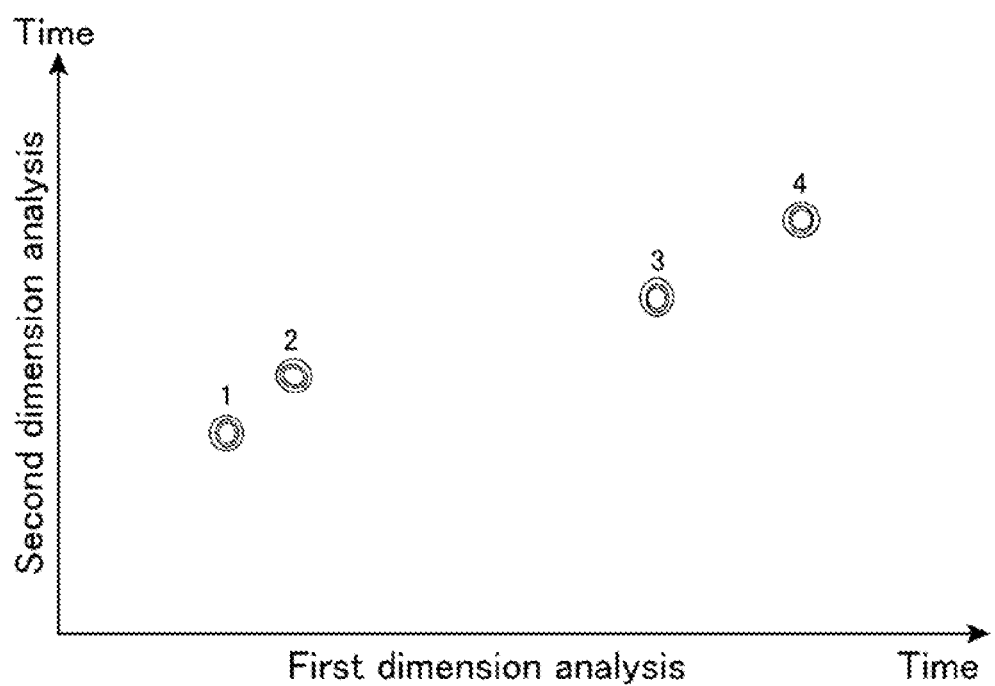
FIG. 6 is an example of analysis data of a two-dimensional liquid chromatograph obtained by adjustment of a shift gradient program.

The arithmetic and control part 10 has a function of managing the operation of the first dimension analysis part 2, the fraction introduction part 6, and the second dimension feeding device 8, and a function of performing predetermined arithmetic processing (for example, creation of a chromatogram as shown on the upper side of FIG. 2 or creation of a two-dimensional map as shown in FIGS. 5 and 6) based on a detection signal of the first dimension detector 22 and a detection signal of the second dimension detector 28. The arithmetic and control part 10 includes a shift gradient program creation part 38 that creates a shift gradient program, a shift timing adjustment part 40 configured to adjust a shift timing of the shift gradient program created by the shift gradient program creation part 38, and a preliminary chromatogram holding part 42.

The arithmetic and control part 10 is realized by a dedicated computer or a general-purpose personal computer. The shift gradient program creation part 38 and the shift timing adjustment part 40 are functions obtained as a predetermined program is executed on a computer that realizes the arithmetic and control part 10. The preliminary chromatogram holding part 42 is a function realized by a partial storage area of a storage device provided in the computer that realizes the arithmetic and control part 10.

The display part 12 is connected to the arithmetic and control part 10, and the arithmetic and control part 10 can display various pieces of information on the display part 12.

The gradient program creation part 38 of the arithmetic and control part 10 is configured to create a shift gradient program based on information on the initial concentration and the final concentration on each stage input by the user. The shift gradient program is created so that the gradient profile of the gradient liquid feeding is shifted at a predetermined timing as shown in the graph on the lower side of FIG. 2.

The shift timing adjustment part 40 is configured to adjust a shift timing to each stage of the shift gradient program created by the gradient program creation part 38 to a timing designated by the user.

When the function of the shift timing adjustment part 40 is enabled, the shift timing adjustment part 40 displays, together with a chromatogram acquired based on analysis performed preliminarily by the first dimension analysis part 2 for a sample to be analyzed (which is referred to as a preliminary chromatogram), a timing of division into each modulation by the fraction introduction part 6, that is, a timing at which the switching valve 30 of the fraction introduction part 6 is switched, on the display part 12. In FIG. 2, the timing of division into each modulation by the fraction introduction part 6 is indicated by a broken line. The preliminary chromatogram is held in the preliminary chromatogram holding part 42. The shift timing adjustment part 38 allows the user to designate an optional shift timing or a timing at which shifting is not performed on the preliminary chromatogram displayed on the display part 12.

FIG. 2 shows one peak portion that appears on the preliminary chromatogram. One peak in the preliminary chromatogram will be divided into two modulations M1 and M2. In an initial shift gradient program (before adjustment), as shown on the lower side of FIG. 2, gradient liquid feeding with gradient profiles different from each other for two of the modulations M1 and M2 containing the same peak component is performed. In such a shift gradient program, analysis of the second dimension is performed with different gradient profiles for the component contained in the modulation M1 and the component contained in the modulation M2, which are the same peak components, and the retention time of the second dimension analysis column 26 may change. When such a phenomenon occurs, a two-dimensional map created based on the detection signal of the first dimension detector 22 and the detection signal of the second dimension detector 28 has a distorted shape like a peak 3 in FIG. 5, and the qualitative and quantitative reliability of the target component is impaired.

Note that the graph on the lower side in FIG. 2 shows the concentration of a predetermined solvent (mobile phase concentration) of the mobile phase for the second dimension analysis supplied to the eluate from the first dimension analysis part 2 having the chromatogram on the upper side of the same diagram. The above similarly applies to graphs on the lower side of FIGS. 3 and 4. Further, the two-dimensional map of FIG. 5 shows the intensity of the detection signals of the detectors 22 and 28 at each time by a contour line, where the retention time of the first dimension analysis column 20 is specified on the horizontal axis and the retention time of the second dimension analysis column 26 is specified on the vertical axis.

In order to avoid the above problem, the shift timing of the shift gradient program is adjusted so that the gradient liquid feeding by the same gradient profile is not performed for modulations including the same peak component. In FIG. 2, the gradient profiles are not shifted between the modulations M1 and M2, and the gradient profiles of the gradient liquid feeding for the modulations M1 and M2 are made the same.

Figure 3:
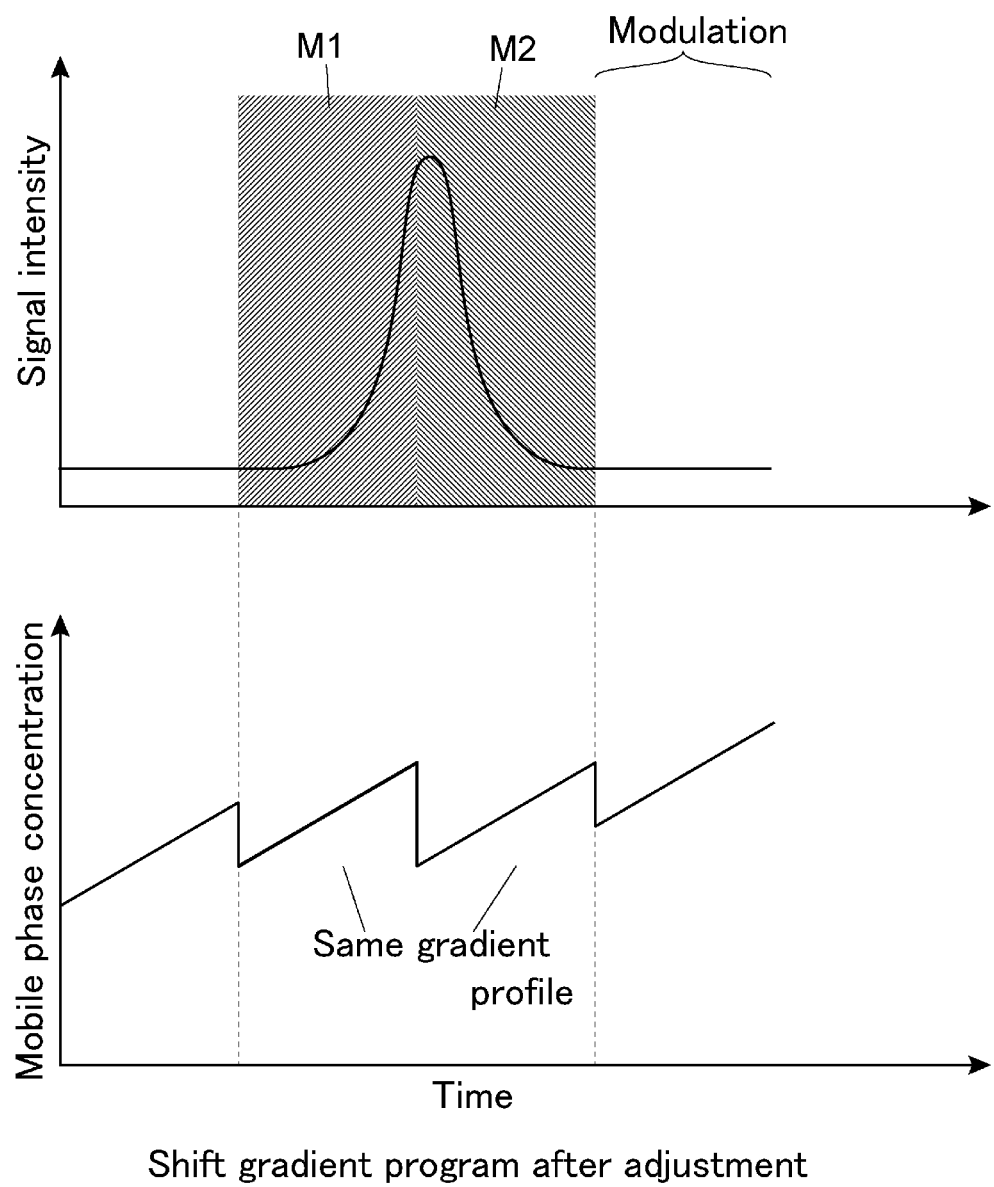
FIG. 3 is a diagram showing an example of the chromatogram and a shift gradient program after adjustment.

In a case where the gradient profiles of the gradient liquid feeding for the modulations M1 and M2 are the same, to the gradient liquid feeding for a modulation after the modulation M2, the gradient profile that is originally set to the modulation M2 may be applied, as shown in the graph on the lower side of FIG. 3. In this case, the total analysis time and the number of modulations increase according to the number of modulations including the same peak component.

Figure 4:
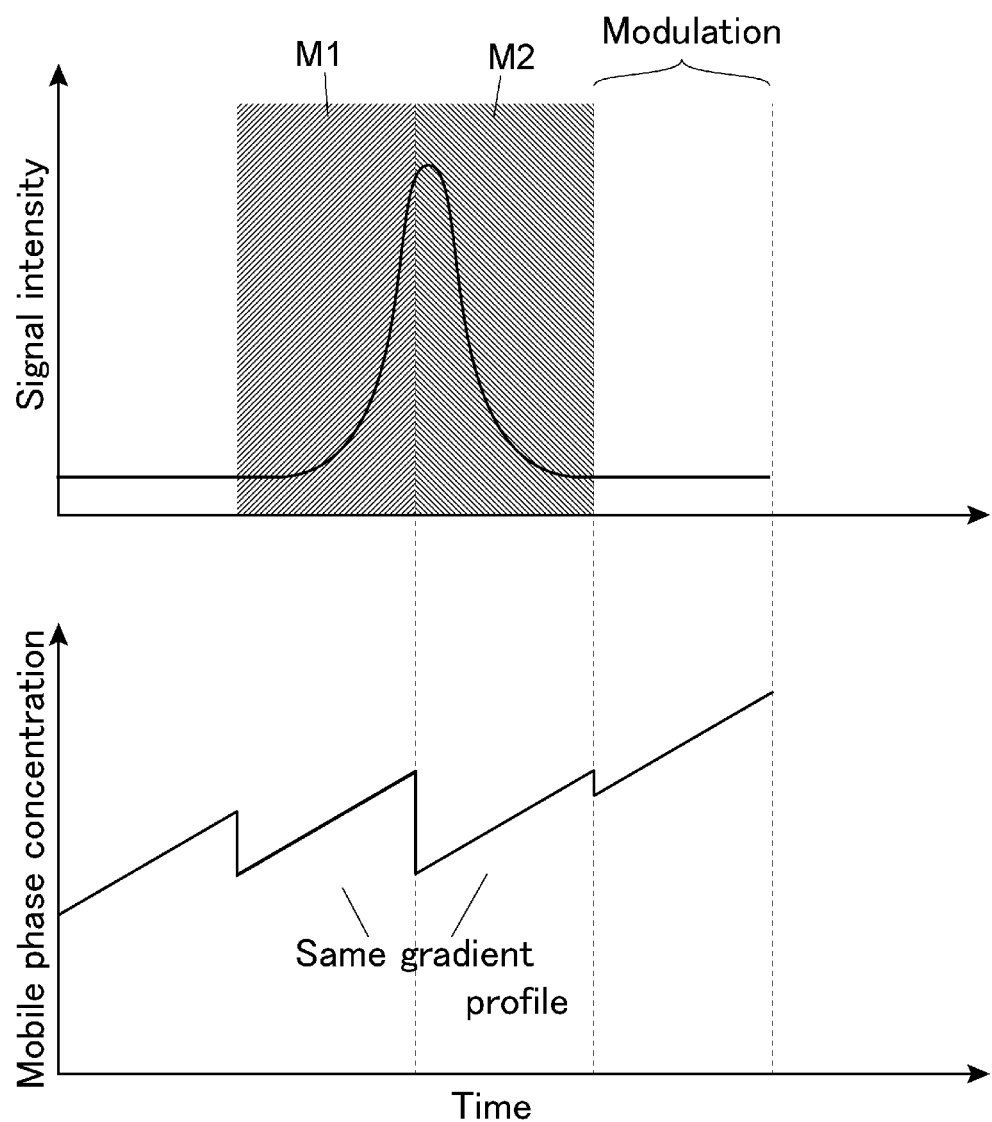
FIG. 4 is a diagram showing another example of the chromatogram and the shift gradient program after adjustment.

Further, in a case where the gradient profiles of the gradient liquid feeding for the modulations M1 and M2 are the same, to the gradient liquid feeding for a modulation after the modulation M2, the gradient profile that is originally set to the modulation may be applied, as shown in the graph on the lower side of FIG. 4. In this case, the entire analysis time and the number of modulations remain to be those at the initial setting regardless of the number of modulations including the same peak component.

As the shift gradient program is adjusted in this manner, the second dimension analysis can be performed with the same gradient profile for the component included in the modulation M1 and the component included in the modulation M2. In this manner, a contour line diagram of the two-dimensional map of the peak 3 has a normal shape as shown in FIG. 6.

The adjustment of the shift gradient program as described above may be performed optionally by the user based on the preliminary chromatogram, or the configuration may be such that the arithmetic and control part 10 automatically recognizes modulations containing the same peak component, and the same gradient profile is applied to these modulations.

DESCRIPTION OF REFERENCE SIGNS

2: First dimension analysis part
4: Second dimension analysis part
6: Fraction introduction part
8: Second dimension feeding device
10: Arithmetic and control part
12: Display part
14: First dimension analysis channel
16: First dimension feeding device
18: Sample injection part
20: First dimension analysis column
22: First dimension detector
24: Second dimension analysis channel
26: Second dimension analysis column
28: Second dimension detector
30: Switching valve
32, 34: Sample loop
35: Second dimension mobile phase liquid feeding channel
36: Liquid feeding control part
38: Shift gradient program creation part
40: Shift timing adjustment part
42: Preliminary chromatogram holding part

The invention claimed is:

1. A two-dimensional liquid chromatograph system comprising:
   a first dimension analysis part that includes a first dimension analysis channel through which a mobile phase for first dimension analysis flows, a sample injection part configured to inject a sample into the first dimension analysis channel, a first dimension analysis column provided on the first dimension analysis channel to separate a sample injected by the sample injection part into each component, and a dimension detector provided downstream of the first analysis column on the first analysis channel to acquire a preliminary chromatogram based on an eluate from the first dimension analysis column;
   a second dimension analysis part that includes a second dimension analysis channel, a second dimension analysis column provided on the second dimension analysis channel, and a second dimension detector for detecting components separated in the second dimension analysis column;
   a second dimension feeding device for feeding a mobile phase for second dimension analysis in the second dimension analysis channel, the second dimension feeding device including a liquid feeding pump that feeds at least two solvents and is configured to mix and feed the at least two solvents, the mobile phase for the second dimension analysis including a concentration of a first solvent of the at least two solvents;
   a fraction introduction part configured to divide an eluate from the first dimension analysis column into a plurality of modulations and to continuously introduce the modulations into the second dimension analysis channel; and
   a computer including a storage, the computer configured to create a first shift gradient program, the first shift gradient program being for causing the second dimension feeding device, during a series of analysis operations for a sample to be analyzed, to repeat, a plurality of times, gradient liquid feeding in which the concentration of the first solvent of the mobile phase for second dimension analysis is temporally changed, and to execute shift gradient liquid feeding in which the concentration of the first solvent is changed in a stepwise manner;

control operation of the second dimension feeding device so that the second feeding device executes the shift gradient liquid feeding based on the first shift gradient program; and create a second shift gradient program in which the first shift gradient program is adjusted so that a same gradient profile is applied to each modulation of the plurality of modulations, the same gradient profile including a same initial concentration of the first solvent; and control operation of the second dimension feeding device so that the second feeding device executes the shift gradient liquid feeding based on the second shift gradient program when respective modulations of the plurality of modulations of the preliminary chromatogram include a same peak component.

2. A two-dimensional liquid chromatograph system according to claim 1, further comprising a display device that displays information, wherein the computer is configured to display the preliminary chromatogram on the display device, and to allow a user to set the second shift gradient program based the preliminary chromatogram.

3. The two-dimensional liquid chromatograph system according to claim 2, wherein the computer is configured to display dividing timings, at which the eluent is divided into the plurality of modulations by the fraction introduction part, on the display device in a manner superimposing the dividing timings on the preliminary chromatogram.

4. The two-dimensional liquid chromatograph system according to claim 1, wherein the fraction introduction part includes a plurality of sample loops, and configured to continuously perform, by switching the sample loops to be connected to each of the first dimension analysis column and the second dimension analysis channel, connecting any one of the sample loops downstream of the first dimension analysis column so that part of an eluate from the first dimension analysis column is captured in the sample loop as one modulation, and, at the same time, connecting one of the sample loops not connected downstream of the first dimension analysis column to the second dimension analysis channel so that the modulation captured in the sample loop is introduced into the second dimension analysis channel.

* * * * *